United States Patent
Moskwinski et al.

(10) Patent No.: US 10,198,479 B2
(45) Date of Patent: Feb. 5, 2019

(54) SYSTEMS AND METHODS FOR CONTEXTUAL RETRIEVAL AND CONTEXTUAL DISPLAY OF RECORDS

(71) Applicant: Ripcord Inc., Hayward, CA (US)

(72) Inventors: Michael Moskwinski, Hayward, CA (US); Alex Fielding, Hayward, CA (US); Kevin Christopher Hall, Hayward, CA (US); Kimberly Lembo, Hayward, CA (US)

(73) Assignee: RIPCORD INC., Hayward, CA (US)

( * ) Notice: Subject to any disclaimer, the term of this patent is extended or adjusted under 35 U.S.C. 154(b) by 0 days.

(21) Appl. No.: 15/848,836

(22) Filed: Dec. 20, 2017

(65) Prior Publication Data

US 2018/0150522 A1  May 31, 2018

Related U.S. Application Data

(63) Continuation of application No. PCT/US2017/046096, filed on Aug. 9, 2017.

(60) Provisional application No. 62/372,565, filed on Aug. 9, 2016, provisional application No. 62/372,571, filed on Aug. 9, 2016, provisional application No. 62/372,577, filed on Aug. 9, 2016.

(51) Int. Cl.
G06F 7/00 (2006.01)
G06F 17/30 (2006.01)
G06F 17/27 (2006.01)

(52) U.S. Cl.
CPC ...... *G06F 17/30528* (2013.01); *G06F 17/277* (2013.01); *G06F 17/30* (2013.01); *G06F 17/30401* (2013.01); *G06F 17/30554* (2013.01)

(58) Field of Classification Search
CPC .. G06F 17/30528; G06F 17/277; G06F 17/30; G06F 17/30401; G06F 17/30554; G06N 99/00; G06N 99/005
See application file for complete search history.

(56) References Cited

U.S. PATENT DOCUMENTS

| | | |
|---|---|---|
| 5,933,322 A | 8/1999 | Ruch et al. |
| 5,933,822 A | 8/1999 | Braden-Harder et al. |
| 7,499,916 B2 | 3/2009 | Liu et al. |
| 7,685,116 B2 | 3/2010 | Pell et al. |
| 7,702,508 B2 | 4/2010 | Bennett |
| 8,239,377 B2 | 8/2012 | Milic-Frayling et al. |

(Continued)

FOREIGN PATENT DOCUMENTS

WO   WO-2012016457 A1   2/2012

OTHER PUBLICATIONS

International Search Report and Written Opinion dated Oct. 25, 2017 for International PCT Patent Application No. PCT/US2017/046096.

*Primary Examiner* — Azam M Cheema
(74) *Attorney, Agent, or Firm* — Wilson Sonsini Goodrich & Rosati

(57) ABSTRACT

Provided are systems and methods for the contextual retrieval and contextual display of records. A search query and/or search results may be contextually enhanced based on (i) natural language processing (NLP) models, (ii) user behavior, and/or (iii) relationships between various entities involved in a search, such as between users, records, and/or fields of expertise. Contextually enhanced search results may be delivered and displayed to a user on a user interface in a contextually relevant order.

18 Claims, 9 Drawing Sheets

(56) References Cited

U.S. PATENT DOCUMENTS

| | | |
|---|---|---|
| 9,336,298 B2 | 5/2016 | Li et al. |
| 9,430,463 B2 | 8/2016 | Futrell et al. |
| 9,536,522 B1 | 1/2017 | Hall et al. |
| 9,710,461 B2 | 7/2017 | Smith et al. |
| 2004/0148164 A1* | 7/2004 | Baker .................... G10L 15/08 704/231 |
| 2004/0215604 A1 | 10/2004 | Ivanov |
| 2005/0289124 A1 | 12/2005 | Kaiser et al. |
| 2007/0061335 A1 | 3/2007 | Ramer et al. |
| 2010/0296445 A1* | 11/2010 | Sarikaya ........... H04L 29/12066 370/328 |
| 2010/0299336 A1 | 11/2010 | Bergstraesser et al. |
| 2013/0124510 A1 | 5/2013 | Guha |
| 2017/0235848 A1* | 8/2017 | Van Dusen ....... G06F 17/30979 705/12 |

\* cited by examiner

| Tag | Description |
|---|---|
| CC | Coordinating conjunction |
| CD | Cardinal number |
| DT | Determiner |
| EX | Existential there |
| FW | Foreign word |
| IN | Preposition or subordinating conjunction |
| JJ | Adjective |
| JJR | Adjective, comparative |
| JJS | Adjective, superlative |
| LS | List item marker |
| MD | Modal |
| NN | Noun, singular or mass |
| NNS | Noun, plural |
| NNP | Proper noun, singular |
| NNPS | Proper noun, plural |
| PDT | Predeterminer |
| POS | Possessive ending |
| PRP | Personal pronoun |

| Tag | Description |
|---|---|
| PRPS | Possessive pronoun |
| RB | Adverb |
| RBR | Adverb, comparative |
| RBS | Adverb, superlative |
| RP | Particle |
| SYM | Symbol |
| TO | to |
| UH | Interjection |
| VB | Verb, base form |
| VBD | Verb, past tense |
| VBG | Verb, gerund or present participle |
| VBN | Verb, past participle |
| VBP | Verb, non-3rd person singular present |
| VBZ | Verb, 3rd person singular present |
| WDT | Wh-determiner |
| WP | Wh-pronoun |
| WPS | Possessive wh-pronoun |
| WRB | Wh-adverb |

*FIG. 3*

| Sample search query | I need tax audit records | I need to audit tax records | looking for tax forms in box 123 | content of box 123 |
|---|---|---|---|---|
| Corresponding query type | What | How | What qualified | List |

| Query type | Weight | Method |
|---|---|---|
| what | 1 | search_engine |
| list | 0.6 | search_engine |
| list | 0.8 | knowledge_graph |
| how | 1 | records_graph |

*FIG. 5*

| | | | |
|---|---|---|---|
| User-generated query: | I need tax audit records | I need to audit tax records | looking for tax forms in box 123 |
| Query type (POS based NLP models) | What | How | What qualified |
| Taxonomy extraction (regex + POS based NLP models) | N/A | N/A | box 123 |
| Context (NLP model clustering) | options for tax: corporate tax, employee tax | N/A | options for tax: corporate tax, employee tax |
| Usage patterns (usage based enhancements) | person works in corporate finance so recommendation is to put more weight on corporate tax | person works in corporate finance so recommendation is to put more weight on corporate tax | person works in corporate finance so recommendation is to put more weight on corporate tax |
| Enhance query | Identify better synonyms, any additional keywords (not contained within the original query) related to the context of the query. In this case, system can append for example: "IRS filings" to original query | Identify taxonomy components best used to execute query. In this case use sharing activity and taxonomy used at that time | Add taxonomy filter for "box 123" |
| Search execution | Put more weight on keyword search | Put more weight on graph search | Put more weight on keyword search |

*FIG. 8*

SYSTEMS AND METHODS FOR CONTEXTUAL RETRIEVAL AND CONTEXTUAL DISPLAY OF RECORDS

CROSS REFERENCE

This application is a continuation of International Patent Application No. PCT/US2017/46096, filed Aug. 9, 2017, which claims the benefit of U.S. Provisional Application No. 62/372,565, filed Aug. 9, 2016, U.S. Provisional Application No. 62/372,571, filed Aug. 9, 2016, and U.S. Provisional Application No. 62/372,577, filed Aug. 9, 2016, each of which applications is entirely incorporated herein by reference.

BACKGROUND OF THE INVENTION

Information can often be stored on physical document files. However, such physical storage systems can demand the availability of extremely large volumes of space for indefinite durations. For example, physical document files may be packed away in archives, warehouses, libraries, and/or vaults. The physical documents, once stored, may also require routine maintenance, such as to prevent damage, destruction, or deterioration (e.g., natural deterioration) of the documents. Furthermore, access of information stored on physical document files may be costly and time consuming. Not only can the physical documents be difficult to locate and transport, but once the physical documents have been identified, extracting the information from the physical files can also be time consuming as well.

As an alternative, information from the physical documents may be transferred to an electronic medium, and stored in memory. In some instances, information can be created and stored electronically. This can obviate the need for storage space and maintenance during storage. Information can be electronically searched from such electronic records. For example, search results can be retrieved in response to a search query provided by a user.

SUMMARY OF THE INVENTION

Even stored as electronic records, specific information and/or documents may be difficult to locate and isolate when there is a myriad of other electronic records to sort through. While search results retrieved in response to a user-provided search query may be, in some aspects, relevant to the user-provided search query, such relevance can oftentimes be very thin or the search results can be relevant in the wrong aspects altogether. It is not uncommon for a user to have to iteratively reformulate the search queries to find the exact information that the user is looking for. Even after running multiple search queries, the user may still not locate the sought-after information. This can lead to considerable time and effort on part of the user. Recognized herein is a need for systems and methods for contextual retrieval of electronic records that address at least the above-identified problems.

The systems and methods provided herein may contextually retrieve electronic records based at least in part on contextual processing and/or natural language-based processing of a user query. Electronic records may be retrieved based at least in part on user behavior. The search results retrieved can be context-specific. The search results retrieved can be user-specific.

The systems and methods provided herein allow for the enhancement of a search query and/or search results based on (i) natural language processing (NLP) models, (ii) user behavior, and/or (iii) relationships between various entities involved in a search, such as between users, records, and/or fields of expertise. The systems and methods provided herein allow for the execution of an enhanced search query using a mechanism more specific to or more compatible with the type of search query. Beneficially, search results may have a higher degree of accuracy and/or more personal to a user and/or a context.

In an aspect, provided is a computer-implemented method for contextually retrieving electronic records based on a search query, comprising: determining, with aid of one or more computer processors, a query type for the search query based at least on a natural language processing (NLP) model definition for the query type; accessing a registry of query types, wherein the registry maps query types to execution methods and comprises priority weight values associated with each query type and execution method pair in the registry; resolving one or more execution methods mapped to the query type; executing the search query using the one or more execution methods mapped to the query type to retrieve a plurality of electronic records as search results, wherein a given electronic record of the plurality of electronic records is weighted by the priority weight values associated with the execution method used to retrieve the given electronic record; and displaying the plurality of electronic records based at least in part on priority weight values of the plurality of electronic records.

In some embodiments, the method can further comprise, prior to execution, enhancing the search query by appending one or more keywords not originally present in the search query or appending a taxonomy filter.

In some embodiments, the one or more keywords are based at least in part on user behavior data for a user providing the search query.

In some embodiments, the method can further comprise, prior to execution, determining a first NLP model corresponding to the search query, wherein the first NLP model corresponds to a first set of one or more keywords, wherein a component of the search query matches at least one keyword of the first set of one or more keywords; determining a second NLP model proximate to the first NLP model, wherein the second NLP model corresponds to a second set of one or more keywords, wherein the first NLP model and second NLP model have a proximity relationship with a weight value at or above a predetermined threshold; and enhancing the search query with keywords of the second set of one or more keyword not originally present in the search query.

In some embodiments, the method can further comprise, prior to execution, using a NLP model definition to perform a taxonomy extraction on the search query to determine the taxonomy filter.

In some embodiments, the NLP model definition is based at least in part on a pattern of part-of-speech or pattern of regular expression.

In some embodiments, the execution methods comprise a keyword search and a graph search.

In some embodiments, the graph search comprises traversing a graph database comprising one or more entities and contextual relationships between the one or more entities to retrieve additional electronic records that are contextually relevant to the plurality of electronic records, a user providing the search query, or both.

In some embodiments, the one or more entities are at least one member from the group consisting of records, users, and fields of expertise.

In some embodiments, the NLP model definition for the query type is based at least on a pattern of part-of-speech.

In another aspect, provided is a computer system for contextually retrieving electronic records based on a search query, comprising: one or more processors; and a memory, communicatively coupled to the one or more processors, including instructions executable by the one or more processors, individually or collectively, to implement a method for classifying an electronic record, the method comprising: receiving, from a user, over a computer network, the search query; accessing, from a graph database, a natural language processing (NLP) model library, wherein the NLP model library comprises a plurality of NLP models, wherein a given NLP model of the plurality of NLP models corresponds one or more sets of keywords; matching the search query against the NLP model library to determine a first NLP model corresponding to the search query, wherein a component of the search query matches at least one keyword of the one or more sets of keywords of the first NLP model; determining one or more other NLP models proximate to the first NLP model, wherein the first NLP model and each of the one or more other NLP models have a proximity relationship with a weight value at or above a predetermined threshold; enhancing the search query by appending one or more keywords corresponding to the one or more other NLP models that are not originally present in the search query; executing the enhanced search query to retrieve a plurality of electronic records as search results; and displaying, to the user, on a graphical user interface communicatively coupled to the one or more processors, the plurality of electronic records.

In some embodiments, the method can further comprise determining, with aid of the one or more computer processors, a query type for the search query based at least on a natural language processing (NLP) model definition for the query type; accessing a registry of query types, wherein the registry maps query types to execution methods and comprises priority weight values associated with each query type and execution method pair in the registry; and executing the enhanced search query using the one or more execution methods mapped to the query type to retrieve the plurality of electronic records, wherein a given electronic record of the plurality of electronic records is weighted by the priority weight values associated with the execution method used to retrieve the given electronic record, wherein the plurality of electronic records is displayed in an order based at least in part on priority weight values of the plurality of electronic records.

In some embodiments, the execution methods comprise a keyword search and a graph search.

In some embodiments, the graph search comprises traversing a graph database comprising one or more entities and contextual relationships between the one or more entities to retrieve additional electronic records that are contextually relevant to the plurality of electronic records, a user providing the search query, or both.

In some embodiments, the one or more entities are at least one member from the group consisting of records, users, and fields of expertise.

In some embodiments, the search query is further enhanced by appending one or more keywords that are based at least in part on user behavior data for the user.

In some embodiments, the user behavior data is stored in, and accessed from, a graph database.

In some embodiments, the method further comprises, prior to execution, executing a user behavior feedback loop on the user to determine the user behavior data.

In some embodiments, the method further comprises, subsequent to displaying, receiving user behavior data from the user.

In some embodiments, the user behavior data comprises at least one of data on whether an electronic record of the plurality of electronic records is selected or unselected, time spent viewing a selected electronic record of the plurality of electronic records, and a degree of scrolling or pagination that a user performs in a record.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3 shows examples of part-of-speech tags.

FIG. 4 shows sample queries and their corresponding query types.

FIG. 5 shows a sample query type registry.

FIG. 8 shows sample queries and processing methods according to the systems and methods of the present disclosure.

DETAILED DESCRIPTION OF THE INVENTION

Figure 1:
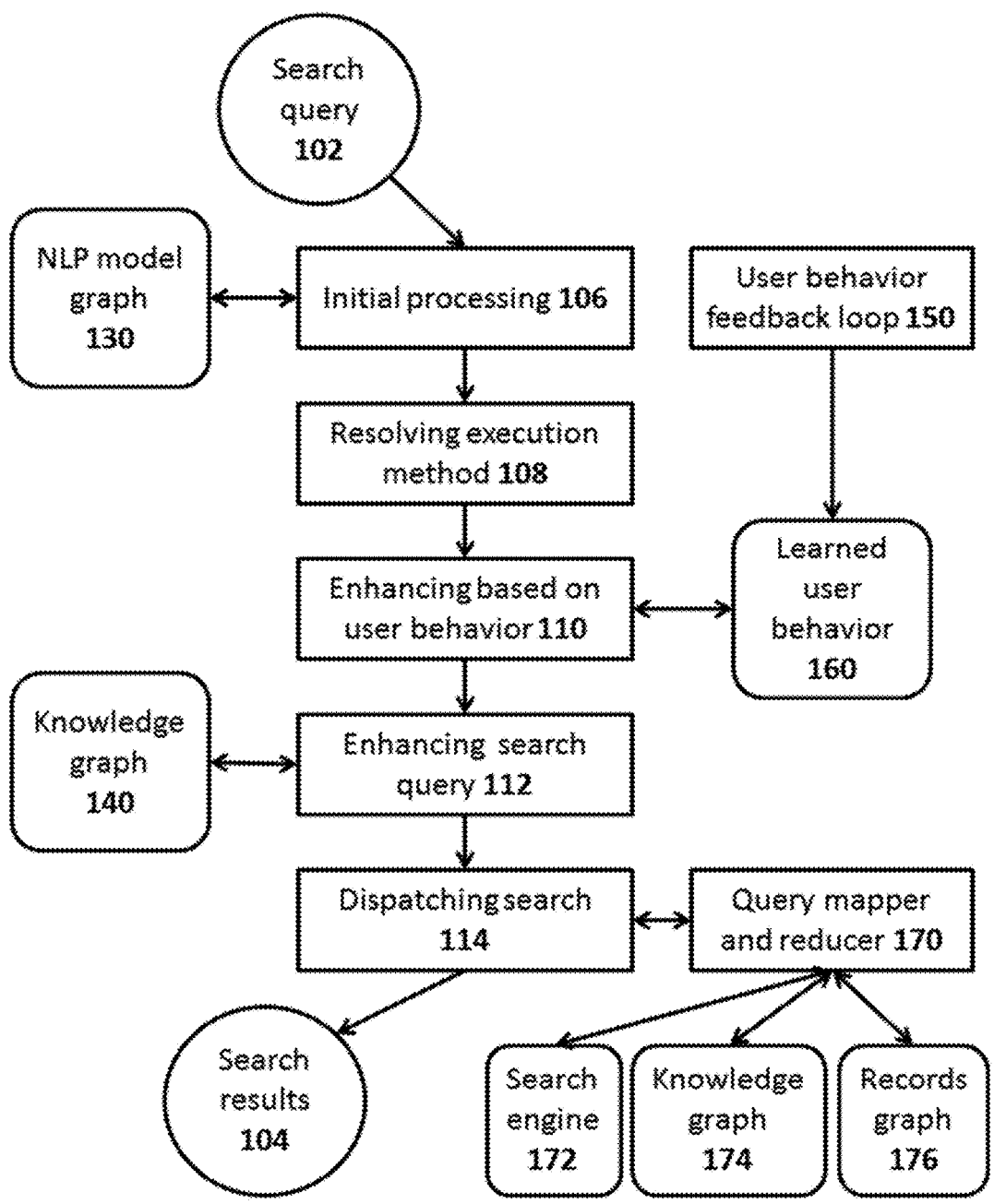
FIG. 1 illustrates a simplified flowchart of a method for the contextual retrieval of records in a record management system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Immense amounts of information can be stored on physical documents, both by governmental agencies and private and public entities. Such documents can be kept in massive archives, warehouses, libraries, and/or vaults. However, physical documents may be difficult to locate, access, search, and/or manipulate manually. Furthermore, it may be difficult to locate, access, search, and/or extract information from such physical documents. Manual methods can be costly, inefficient, unreliable and/or subject to privacy concerns. For example, human handling of large amounts of documents may be slow, prone to error, damaging to human health due to exposure to chemicals in the documents and exposure to fasteners, damaging to the documents, and/or be susceptible to security leaks when documents containing sensitive information are involved. Locating particular documents and/or transportation of such documents may be laborious and costly. Storage of information on physical documents may also be prone to loss, such as when the physical documents are lost, damaged, otherwise materially degraded (e.g., fading ink, weakened integrity of sheets, etc.), destroyed and/or mislabeled. For at least the reasons described herein, extraction of information stored on physical documents may be difficult, thereby hindering or preventing access to an immense amount of stored information.

Conversion of the information stored on physical documents to digital information can make the information easily accessible through digital searching. For example, the physical documents can be digitally scanned or otherwise imaged, such as with a camera or other imaging device or optical sensor. In some instances, large volumes of physical documents (e.g., millions) can be converted to electronic records via automated or semi-automated systems and methods. Such automated or semi-automated systems and methods can be configured to process large volumes of physical documents efficiently and with substantial uniformity, such as by automating one or more processes (e.g., sorting disorganized document stacks, isolating sheets from document stacks, unfastening fasteners affixed to one or more sheets, feeding a document into a device, scanning a document, orienting a document, disposing of scanned documents, etc.) otherwise manually performed during conversion of a physical document to an electronic record. The systems and methods described herein can be part of an automated end-to-end process involving the conversion of physical documents to electronic records, tagging of the electronic records, and search of the tagged electronic records. In some instances, untagged electronic records can be searched.

In some instances, the digitized information can be further processed, such as undergoing text recognition (e.g., optical character recognition (OCR)). The digitized information can be stored in an on-site or remote server at a secured location, and/or may be easily and reliably duplicated upon request. Digitization of the information can improve reliability, reduce costs, and/or avoid exposure of sensitive information. However, while digital information may be more easily searched than information stored on physical documents, and can be easily sent to a target destination after digitization, even as electronic records, specific information and/or documents may be difficult to locate and isolate when there is a myriad of other electronic records to sort through.

Provided are systems and methods for facilitating contextual retrieval of electronic records. The systems and methods provided herein may contextually retrieve electronic records based at least in part on contextual processing and/or natural language-based processing of a user query. The systems and methods can use one or more natural language processing (NLP) models. Electronic records may be retrieved based at least in part on user behavior. The search results retrieved can be context-specific. The search results retrieved can be user-specific. Beneficially, search results can be personalized to a user. The search results may be responsive to a natural language-based user query. Beneficially, a user may not have to learn special search syntax (e.g., operators, etc.) to obtain contextually relevant and/or user-specific search results.

The systems and methods described herein can apply to the retrieval of both electronic records that have been converted (e.g., digitally scanned or otherwise imaged) from physical files and electronic records that have been created and stored as electronic files.

The systems and methods described herein can apply to the search and retrieval of electronic records in a record management system. A record management system can comprise a plurality of electronic records. The record management system described herein can comprise any number of electronic records. For example, the records management can comprise at least 1, 10, 100, $10^3$, $10^4$, $10^5$, $10^6$, $10^7$, $10^8$, $10^9$, $10^{12}$, $10^{15}$, or more electronic records. An electronic record can be any digital record containing information, such as, for example, text and/or images. An electronic record can be an electronic document or an excerpt (e.g., words, phrases, sentences, paragraphs, sections, chapters, pages, other segments, etc.) from an electronic document. An electronic record can be a digital image of a physical document or of an excerpt from a physical document. An electronic record can be a post, a list, a comment, a note, a pamphlet, a guide, a manual, a photograph, a picture, an image, a graphic, a graph, a table, a chart, a blog, a website, a hyperlink (e.g., URL), an article, any text and/or images, any other information, and/or a combination thereof available offline and/or online (e.g., such as on the Internet) electronically.

Alternatively or in addition, the systems and methods described herein can apply to the search and retrieval of electronic records in any storage system, database, data structure, search engine, graph, chart, table, a plurality of any of the above, and/or any combination of the above.

The systems and methods described herein can apply to the retrieval of both electronic records that have been tagged and electronic records that have not been tagged. A tag can be a label used to describe an electronic record. A tag can be a label used to group different electronic records with a common theme. A tag can be a text string. A tag can be a numerical value. A tag can be a keyword and/or phrase. A tag can be a name. A tag can be a rating. A tag can be a category, group, topic, and/or type. A tag can be a note. A tag can be one or more components of unstructured taxonomy. A tag can be standardized information. A tag can be any metadata field for an electronic record or file. A tag may be stored as a metadata field for an electronic record, such as when assigned to the electronic record. In some instances, a tag can be binary (e.g., yes/no, o/x, 0/1, etc.). A tag may be assignable to and/or removable from an electronic record. A tag may be used to index an electronic record. A tag may be used to classify an electronic record. A tag may be used to search and filter electronic records. A tag may be changed, modified, and/or otherwise updated. In some instances, a tag may be changed, modified, and/or otherwise updated while assigned to one or more electronic records.

The systems and methods provided herein allow for the enhancement of a search query and/or search results based on (i) natural language processing (NLP) models, (ii) user behavior, and/or (iii) relationships between various entities involved in a search, such as between users, records, and/or fields of expertise. The systems and methods provided herein allow for the execution of an enhanced search query using a mechanism more specific to or more compatible with the type of search query. Different mechanisms can be used to execute different types of queries. Beneficially, search results may have a higher degree of accuracy. Beneficially, search results may be more personal to a user and/or a context.

In some instances, a first NLP model can be used to determine a query type, such as by using a pattern of part-of-speech or pattern of regular expression. Furthermore, other NLP models determined to be proximate to the first NLP model can be used to enhance the search query, such as by appending keywords corresponding to the other NLP models that were not originally present in the search query.

In some instances, a search query can be enhanced by user behavior. A record management system may learn user behavior, for example, via a user behavior feedback loop and use such user behavior data to enhance the search query. The system may learn user behavior from user activities, such as sharing of records, viewing of records, searching through records, and/or clicking on records from search results.

In some instances, a knowledge graph comprising relationships between various entities involved in a search, such as between users, records, and/or fields of expertise, can be traversed to enhance the search query and/or search results to facilitate the contextual retrieval of electronic records.

FIG. 1 illustrates a simplified flowchart of systems and methods for the contextual retrieval of records in a record management system.

A user can provide a search query 102 to a record management system to, after one or more operations performed by the system, obtain search results 104. The user may or may not be a user of the record management system. For example, a user can be an operator, manager, or administrator of the record management system. A user can be a customer of the record management system. A user can be a provider of documents and/or records to the record management system. A user can be a creator of documents and/or records to the record management system. A user can be an individual. A user can be an entity. A user can be a plurality of individuals. A user can be a plurality of entities. In some instances, the record management system may identify users by unique identifiers (e.g., user name, user account, user ID, etc.). User-specific information for a user, such as user behavior, may be associated with a unique identifier of the user and stored in one or more databases.

The search query 102 can be provided by the user via a user interface provided by the system. The user interface may be a graphical user interface (GUI) and/or web-based interface. The user interface may have an input field (e.g., graphical rectangular box) for receiving the search query. The system may show the user interface, for example, on a display (e.g., electronic display) of a user device. The display can be separate and communicatively coupled to the user device. The user device may be, for example, a mobile device (e.g., smartphone, tablet, pager, personal digital assistant (PDA)), a computer (e.g., laptop computer, desktop computer, server), and/or a wearable device (e.g., smart-watches). A user device can also include any other media content player, for example, a set-top box, a television set, a video game system, or any electronic device capable of providing or rendering data. The user device may optionally be portable. The user device may be handheld. The user device may be a network device capable of connecting to a network, such as a local area network (LAN), wide area network (WAN) such as the Internet, a telecommunications network, a data network, or any other type of network (e.g., extranet, intranet, etc.).

The user device may comprise memory storage units which may comprise non-transitory computer readable medium comprising code, logic, or instructions for performing one or more operations described herein. The user device may comprise one or more processors capable of executing one or more steps, for instance in accordance with the non-transitory computer readable media. The user device may be capable of accepting inputs, such as the search query, via a user interactive device. Examples of such user interactive devices may include a keyboard, button, mouse, touchscreen, touchpad, joystick, trackball, camera, microphone, motion sensor, heat sensor, inertial sensor, or any other type of user interactive device. The user device may be capable of executing software or applications provided by a record management system and/or accessing a user interface provided by the record management system. The user device can be a computer control system, which is described further below. The user device can be capable of communicating with other computer systems, or one or more components thereof, such as a server, a data network (e.g., a cloud computing network, etc.), or a database.

The search query 102 can be in the form of text (e.g., a string). The search query can be provided in natural language. In some cases, a text query can be provided via voice to text conversion. The query can be provided in the form of a string. The query may include a hyperlink (e.g., URL). In some examples, the string can have a character limit of about 1000 characters, 500 characters, 400 characters, 300 characters, 200 characters, 150 characters, 140 characters, 130 characters, 120 characters, 110 characters, 100 characters, 50 characters, 40 characters, 30 characters, 20 characters, 10 characters, or less. Alternatively, the string may have more than 1000 characters. The string may not have a character limit. In some instances, the query can have a word limit of about 1000 words, 500 words, 400 words, 300 words, 200 words, 150 words, 100 words, 50 words, 40 words, 30 words, 20 words, 10 words, or less. Alternatively, the query can have more than 1000 words. The query may not have a word limit. The query may be in any language, including English and non-English languages.

When a user-provided search query 102 is provided to the system, the system can begin initial processing 106 of the search query to enhance the search query. During initial processing, the system can match the search query, or components of the search query, to potentially relevant natural language processing (NLP) models to enhance the search query by appending one or more keywords corresponding to relevant NLP models. As described below, the search query may be matched against a library of NLP models.

NLP models can be capable of learning, interpreting, and understanding the natural language of humans, such as a syntax (e.g., grammar), semantics (e.g., meaning), pragmatics (e.g., purpose, goal, intent), and/or other units of linguistics (e.g., various lexical relationships). NLP models can utilize one or more NLP and/or natural language understanding (NLU) techniques. NLP models may become more accurate with increased number of iterations, such as but not limited to number of search iterations or number of other user interactions.

In some instances, NLP models can take distributional approaches, such as large-scale statistical tactics of machine learning and/or deep learning. For example, distributional approaches can convert content into word vectors and perform mathematical analysis to understand, for example, the relationship between the words. Distributional NLP models can include neural network models, such as end-to-end attentional memory networks, and joint multi-task models. In some instances, NLP models can take frame-based approaches, such as framing semantically identical (e.g., but syntactically or pragmatically different) into frames (or data structures) by parsing the content and populating the frame parameters. In some instances, NLP models can take model-theoretical approaches. Model-theoretical approaches may perform semantic parsing of content into compositions, recombination of compositions, and execution. Model-theoretical approaches may receive human supervision, and benefit from full-world representation, rich semantics, end-to-end processing, and enablement of understanding difficult and nuanced search queries. In some instances, NLP models can take interactive learning approaches. Interactive learning NLP models can interact with humans and based at least in part on such interactions, learn gradually the natural language of humans. For example, interactive learning models may interpret language consistently used to perform the same action or yield the same outcome as the correct language for the same action or the same outcome. Alternatively or in addition, NLP models can take different approaches to learn, interpret, and/or understand natural language. In some instances, NLP models can be a combination of different approaches.

During initial processing 106, the search query 102, and/or components thereof (e.g., tokens), can be evaluated against a library of NLP models. NLP models can be stored in a NLP model library. The NLP model library may be stored in memory of a computer system (e.g., server), such as in one or more databases. The NLP model library may be stored in a graph database 130, as described further below. The computer system may comprise and/or be in communication with a data network, such as a cloud computing network. In some instances, the one or more databases (e.g., graph database) may be stored in and/or in communication with the data network, and the computer system may access such one or more databases via the data network. In some instances, the NLP model library can comprise at least about 1, 2, 3, 4, 5, 6, 7, 8, 9, 10, 15, 20, 25, 30, 35, 40, 45, 50, 100, 200, 300, 400, 500, 1000 or more NLP models. In some instances, the NLP model library can comprise at most about 1000, 500, 400, 300, 200, 100, 50, 45, 40, 35, 30, 25, 20, 15, 10, 9, 8, 7, 6, 5, 4, 3, 2, or 1 NLP models.

An NLP model can correspond to one or more keywords or one or more sets of keywords. An NLP model can correspond to one or more terms or one or more sets of terms. In some instances, an NLP model can correspond to at least about 1, 2, 3, 4, 5, 6, 7, 8, 9, 10, 15, 20, 25, 30, 35, 40, 45, 50, 100, 200, 300, 400, 500, 1000 or more keywords (or terms) or sets of keywords (or terms). In some instances, an NLP model can correspond to at most about 1000, 500, 400, 300, 200, 100, 50, 45, 40, 35, 30, 25, 20, 15, 10, 9, 8, 7, 6, 5, 4, 3, 2, or 1 keywords (terms) or sets of keywords (or terms).

For example, keyword-based queries may be tokenized into one or more tokens. A token can be a keyword. A token can be a topic. A token can be a lexical relationship. A token can be any lexical sub-unit (e.g., paragraph, sentence, word, letter, part of speech, semantics, syntax, pragmatics, keyword, etc.). The system may evaluate the tokenized query against the library of NLP models. In some instances, for example, the system may compare tokens in the tokenized query to keywords or sets of keywords in the NLP models.

The system may determine one or more NLP models corresponding to the tokenized query. In some instances, a search query can correspond to at least about 1, 2, 3, 4, 5, 6, 7, 8, 9, 10, 15, 20, 25, 30, 35, 40, 45, 50, 100, or more NLP models. In some instances, a search query can correspond to at most about 100, 50, 45, 40, 35, 30, 25, 20, 15, 10, 9, 8, 7, 6, 5, 4, 3, 2, or 1 NLP models.

Figure 2:
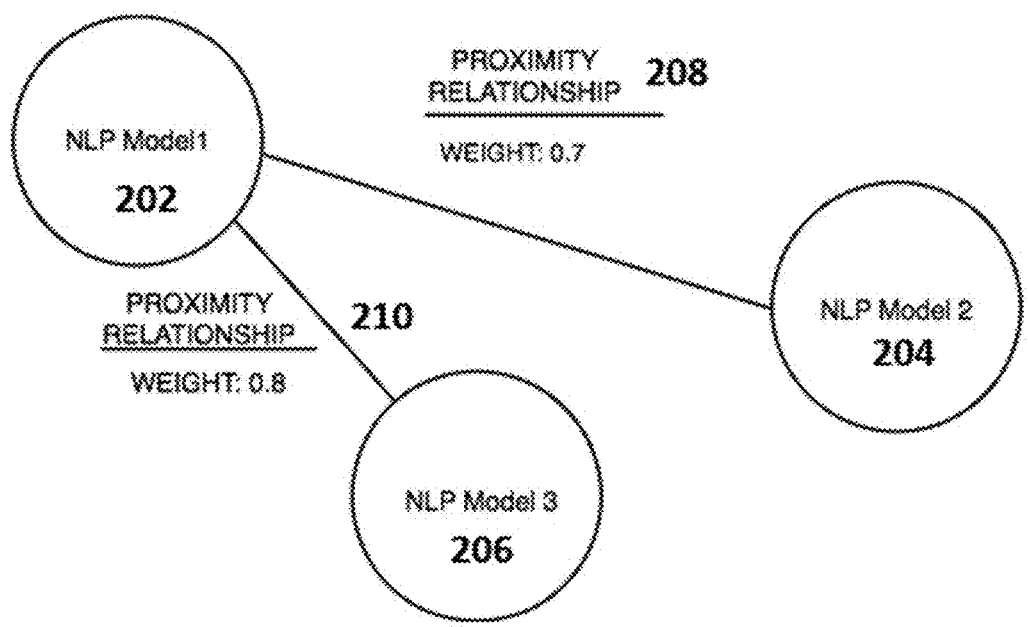
FIG. 2 shows part of a graph database of an NLP model library.

As described above, the NLP model library can be stored in a graph database 130. The graph database can comprise the NLP models and proximity relationships between the NLP models. FIG. 2 shows part of a graph database 200 of an NLP model library. The graph database 200 can comprise a first NLP model 202, a second NLP model 204, a third NLP model 206, a first proximity relationship 208 between the first NLP model 202 and the second NLP model 204, and a second proximity relationship 210 between the first NLP model 202 and the third NLP model 206. The graph database can comprise any number of NLP models. In some instances, the graph database can comprise all NLP models in the NLP model library. In some instances, the graph database can comprise only some NLP models in the NLP model library. In some instances, a plurality of graph databases can, individually or collectively, store the NLP models in the NLP model library.

Proximity relationships (e.g., proximity relationships 208, 210, etc.) between NLP models (e.g., NLP models 202, 204, 206, etc.) can define a relevance level between the NLP models. A proximity relationship can be between any two NLP models. A proximity relationship can be between any combinations of NLP models. The relevance level can be represented by a weight value. A weight value can be indicative of a degree of proximity between the NLP models. For example, a higher weight value can correspond to a higher degree of proximity than a lower weight value. A weight value can be binary (e.g., 0 or 1 corresponding to not proximate or proximate). A weight value can have any scale (e.g., from 0 to 1, from 0 to 5, from 0 to 10, from 0 to 100, from 50 to 100, etc.). By way of example, where the weight value scale is from 0 to 1, the first proximity relationship 208 between the first NLP model 202 and the second NLP model 204 can have a weight value of 0.7. The second proximity relationship 210 between the first NLP model 202 and the third NLP model 206 can have a weight value of 0.8. In this example, the first NLP model 202 can be more proximate to the second NLP model 204 than the third NLP model 206. Beneficially, a proximity relationship between two NLP models can also be indicative of a proximity relationship between keywords belonging to the two NLP models. Alternatively or in addition, other scoring systems or scales may be used for weight values (e.g., percentages, out of different maximum value such as 5, 10, 100, binary such as 0 or 1, etc.).

In some instances, a proximity relationship may exist between two NLP models only if the weight value is at or above a threshold level, e.g., 0.8, 80%, 80/100, or other corresponding value in another corresponding scale. Alternatively, a proximity relationship may exist between two NLP models only if the weight value is at or above another value (other than 0.8 or corresponding value in corresponding scale). In some instances, a proximity relationship may exist between any two NLP models, for example, even if the weight value is 0 representing little or no relevance between the two NLP models.

Referring back to FIG. 1, once the system determines one or more NLP models corresponding to the search query 102, the system may search the NLP model library graph 130 for other NLP models in close proximity to the one or more NLP models corresponding to the search query. For example, the system may select other NLP models having a proximity relationship weight value above a predetermined threshold (e.g., 0.5, 0.6, 0.7, 0.8, 0.9, 0.95, 0.99, etc.). In another example, the system may select a certain number (e.g., 5, 6, 7, 8, 9, 10, etc.) of the top most proximate NLP models to the one or more NLP models corresponding to the search query. For search queries that are keyword searches, the system may then append one or more keywords or sets of keywords in the other NLP models that were not originally in the user-provided search query. Beneficially, the search query may be enhanced with keywords and/or sets of keywords not originally contemplated by the user but that are still relevant.

In some instances, during initial processing 106, any relevant keywords that are frequently used in similar queries may also be appended to the search query 102. For example, the system can enhance the search query by appending any relevant keywords that are frequently used in similar queries. The similarity of queries can be determined by analyzing relationships between various entities (e.g., records, users, fields of expertise, etc.), such as via a knowledge graph, which is described further below.

The system can resolve 108 an execution method for the search query 102 by determining a query type. Query types can identify a type of user intent for submitting the query. In some instances, a query type can be a type of classification for queries. For example, query types can be of a "who" form, "what" form, a "when" form, a "where" form, a "how" form, a "why" form, a "list" form, or other forms. Depending on the query type, different mechanisms of enhancement (e.g., based on NLP, based on user behavior, based on relationships between different entities, etc.) can be used.

Query types may be determined by pre-trained short text NLP models. For example, a model definition can be defined as a sequence of keywords and part-of-speech tags. Part-of-speech tags can comprise text tagged with parts of speech (e.g., common noun, plural common noun, proper noun, modal verb, base verb, adjective, comparative adjective, etc.). By way of example, a definition of "looking/VBG, for/IN, [NN], . . . , in/IN, [NN], . . . " can have the tags VBG (verb gerund), IN (preposition or subordinating conjunction), and NN (common noun). Examples of other part-of-speech tags are shown in FIG. 3. Parts-of-speech tags are not limited to those shown in FIG. 3. The NLP models can be used not only for recognition of query type but also for extraction of information in search queries. Some search methods, such as qualified search, can depend on information extracted from user-provided search queries and may include taxonomy components or other filtering criteria based on the extracted information.

As an example, a part-of-speech tagged pattern can be: "[NN] [VBG] tax/NN records/NNS." In this case, a first token is an unqualified noun, "[NN]," followed by an unqualified verb, "[VBG]," and two qualified nouns "tax/NN" and "records/NNS." A user may define the weights for each token in a pattern such that the total weight of the pattern is 1. The token weights can determine how specific patterns are scored to determine a pattern proximity score, which can be compared to a minimum threshold score for the NLP model definition. Expanding on the previous example, the same pattern with weight definitions can be: "[NN-0.2] [VBG-0.1] tax/NN-0.4 records/NNS-0.3," where the unqualified noun of [NN] has a weight of 0.2, the unqualified verb of [VBG] has a weight of 0.1, the qualified noun of "tax/NN" has a weight of 0.4, and the qualified noun of "records/NNS" has a weight of 0.3. The user may further define a minimum threshold for the acceptance of text as conforming to the pattern, such as 0.8. A stricter minimum threshold of 1 may require that the text conform exactly to the pattern of part-of-speech. In some instances, a minimum threshold of 0 may allow the classification method to accept text of any pattern regardless of conformity to the part-of-speech tagged pattern. The user may define any minimum threshold value.

The system can automatically tag the search query text with part-of-speech tags. After tagging, the text can be tokenized into tokens containing keywords and part-of-speech tags. For example, the following text, "information containing tax records," can be tagged and tokenized into "information/NN, containing/VBG, tax/NN, records/NNS." Once the text has been tagged and tokenized, the system can score the text by determining if the pattern defined in the NLP model exists in the text. The text can be compared to individual tokens. If one or more individual tokens match, the weight associated with the individual tokens in a pattern can be aggregated to determine a pattern proximity score. Once all tokens have been processed, the pattern proximity score can be compared to the minimum threshold value. In some instances, if the pattern proximity score is at or higher than the minimum threshold value, the query can be classified to the query type of the NLP model.

FIG. 4 shows sample queries and their corresponding query types. For example, a sample search query of "I need tax audit records" can be determined to be of a query type of 'what' based at least in part on the "I need" pattern of part-of-speech in the query. In another example, a sample search query of "I need to audit tax records" can be determined to be of a query type of 'how' based at least in part on the "I need to" pattern of part-of-speech and keywords in the query. In another example, a sample search query of "looking for tax forms in box 123" can be determined to be of a query type of 'what qualified' based at least in part on the "looking for" pattern of part-of-speech and keywords in the query. In another example, a sample search query of "content of box 123" can be determined to be of a query type of 'list' based at least in part on the "content of" pattern of part-of-speech and keywords in the query.

In some instances, the NLP model definitions for query types can be trained with each search iteration, such as from training data obtained from previous searches. Alternatively, query types may be determined by other NLP models.

Different query types can be mapped to different execution methods. In some instances, a query type can be mapped to only one execution method. In some instances, a query type can be mapped to a plurality of execution methods. In some instances, an execution method can be mapped to a plurality of query types. Where a query type is mapped to a plurality of execution methods, the search results retrieved by each execution method can be weighted by a relative priority weight value. The query types, corresponding execution methods, and relative priority weight values may be stored in a query type registry, such as in one or more databases of the system. In some instances, all query type-execution method pairs can be stored in the registry, even for those pairs having a priority weight value of 0. In other instances, only query type-execution method pairs having a priority weight value above a predetermined threshold (e.g., 0.5, 0.6, 0.7, 0.8, 0.9, 0.95, 0.96, 0.97, 0.98, 0.99, etc.) can be stored in the registry. An execution method particularly appropriate for executing a query type can have a higher priority weight value than other execution methods. For example, a query type having a "what" form can be more apt for a keyword search than a user behavioral search, and thus a "search_engine" execution method may have a higher weight value than a "knowledge_graph" execution method. In another example, a "how" form can be more apt for a "knowledge_graph" execution method than a "search_engine" execution method.

FIG. 5 shows a sample query type registry. A query type registry 500 can comprise a query type column 502, a priority weight column 504, and an execution method column 506. In some instances, a search query can be executed using multiple methods, search collections, and data stores. The priority weight values can represent priority coefficients that are applied to search results retrieved using the execution method for the search query. For example, for the query type registry 500, if a query type for a search query is 'list,' and both a 'search_engine' method and 'knowledge_graph' method is used to retrieve search results, the portion of search results retrieved using the 'search_engine' method can be weighted by the priority weight value of '0.6,' and the portion of search results retrieved using the 'knowledge_graph' method can be weighted by the priority weight value of '0.8.' Beneficially, when the combined search results are sorted, such as by relevance, the search results retrieved using the 'knowledge_graph' method, which is presumed to be more relevant by the relative priority weight values, can be presented at higher priority than the search results retrieved using the 'search_engine' method. Alternatively or in addition, a different priority weight and/or coefficient scoring system and/or scale can be used as appropriate.

The query type registry can be defined manually. For example, initially, before any search iteration is executed by the system, an execution method can be manually mapped to a query type and a priority weight can be manually assigned for each query type-execution method pair. However, after sufficient training data is collected from search iterations, for example, data on actual priority of search results based on user behavior (e.g., actual views of search results, etc.), the query type registry can be updated, such as via a feedback loop algorithm, such that the registry is semi-supervised or even unsupervised. Each search iteration can yield training data. For example, with sufficient training data, the registry may be updated and/or operate with limited, or even without, manual intervention. In some instances, a default execution method can be the traditional search engine (e.g., 'search_engine' method).

Referring back to FIG. 1, the system may enhance 110 the search query 102 based on user behavior. A user behavior feedback loop 150 can generate data on learned user behavior 160 from specific users. The user behavior feedback loop can collect information relating to any previous enhancements of user-provided search queries for a specific user, as well as information relating to the specific user's interaction with certain search results. A user's interactions with a search result can be, for example, whether a record is selected or unselected, time spent viewing a selected record, a degree of scrolling or pagination that a user performed in a record, and other interactions. In some instances, the system may also collect information on which records are accessed together and/or accessed during the same searching session of the user. Such information can allow the system to determine a user's interest areas. Subsequent queries by the user may be enhanced and personalized to the user behavior and/or the user's interest areas.

Figure 6:
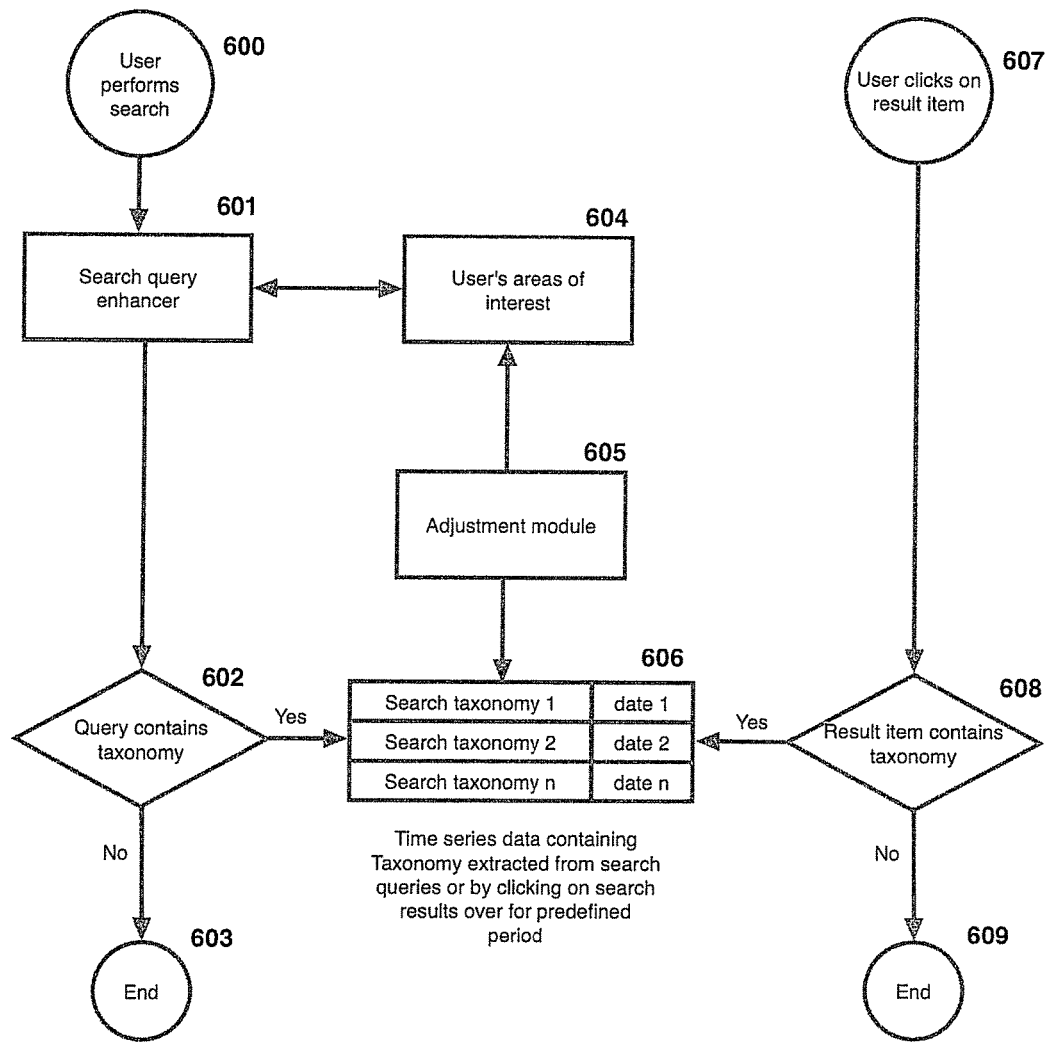
FIG. 6 illustrates an example of a user behavior feedback loop.

FIG. 6 illustrates an example of a user behavior feedback loop. The user behavior feedback loop 600 may fine-tune a user's personal search preferences and areas of interest. The process begins by the user providing a search query 600, receiving search results in response to the search query, and clicking 607 on specific items in the search results. The search query can go through the process of taxonomy extraction 602 before it is executed, as described elsewhere herein, such as to enhance 601 the search query itself. Similarly, some records may have taxonomy items associated 608 with them. In the process of the feedback loop, the system can collect information on taxonomy extracted from both the search query and the result items that the user clicks on, and store this information in the time series 606. The time series data may contain no more than three months of data for each user. For example, any data that is older than three months can be deleted. In other instances, the time series data may contain data from within other time durations (e.g., on the order of minutes, hours, days, months, years, decades, etc.). The purpose of this expiration is to fluidly adapt to changes in user behavior. For example, users may move from job to job and/or from department to department, rendering some older data less relevant, or in some instances, completely irrelevant. The system may adopt its search enhancements accordingly. The time series data can be processed by the adjustment module 605. The adjustment module may analyze time series data by first eliminating any anomalies and then collecting frequency information on most used taxonomy items per user. This information in turn can be used to determine user preferences and areas of interest 604. Once (or if) user preferences and/or areas of interest are determined, the system may append taxonomy items corresponding to such user preferences and/or areas of interest to the user's search query accordingly.

The enhancement based on learned user behavior data can beneficially personalize the search query, and subsequent search results, to a specific user.

Referring back to FIG. 1, the system may enhance 112 the search query 102 and/or search results 104 based on a knowledge graph 140 comprising contextual relationships between various entities, such as between users, records, and fields of expertise.

A knowledge graph 140 can comprise contextual relationships between different records, such as by analyzing user interactions with records and/or the attributes of electronic records. For example, contextual relationships between records can be determined for records that exist in the same folder or same box, frequently appear in the same search results, frequently accessed during the same search session, shared together, viewed or commented on by users that are related, such as, for example, by working in the same organization or same department, or by sharing the same field of expertise. In some instances, users may define specific attributes to electronic records, such as in the form of tags and/or metadata. The specific attributes may or may not be user-specific. The specific attributes can be used as taxonomy elements to define contextual relationships between records. The contextual relationships between records can evolve over time, such as with the performance of each search iteration. For example, a relationship between two records that are commented on by related users in different search sessions can become closer.

A knowledge graph can store contextual relationships not only between different records, but also between different users, between different fields of expertise, between different records and users, between different records and fields of expertise, between different users and fields of expertise, and/or between different entities. Beneficially, the knowledge graph can comprise information about both contextual relationships and networks of records and contextual relationships and activities between the records and the users. Such storing of contextual relationships can allow for the creation of information clusters that contain relationships not only between electronic records and taxonomy components, but also relationships between aggregated machine-learned components of user behavior and their relationships to records or taxonomy components. The graph data structure can be constantly updated by operating machine-learning algorithms, and added data of record manipulation and/or search sessions.

Figure 7:
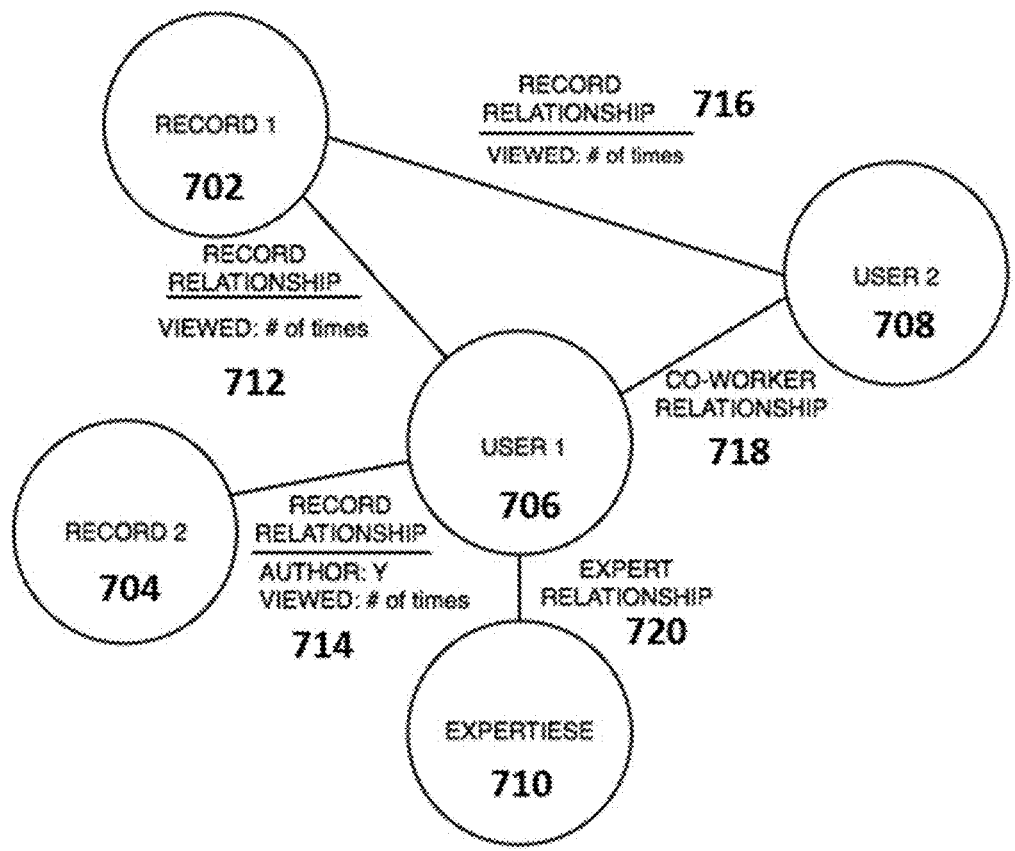
FIG. 7 shows a knowledge graph database of various entities that can be traversed to enhance search results.

FIG. 7 shows a knowledge graph database of various entities that can be traversed to enhance search results. The knowledge graph database 700 may comprise the following entities: a first record 702, a second record 704, a first user 706, a second user 708, and a first field of expertise 710. The knowledge graph database may comprise the following relationships between the various entities: a first record relationship 712 between the first record 702 and the first user 706, a second record relationship 714 between the second record 704 and the first user 706, a third record relationship 716 between the first record 702 and the second user 716, a first user relationship 718 between the first user 706 and the second user 708, and an expert relationship between the first user 706 and the first field of expertise 710.

A record relationship (e.g., 712, 714, 716) between a user and a record, for example, can comprise a number of views of the record by the user, an author of the record, and a search query used by the user to retrieve the record. A user relationship (e.g., 718) between two users, for example, can comprise a type of relationship (e.g., coworker relationship, family relationship, friend relationship, professional relationship, etc.). Any contextual relationship in the knowledge graph 800 can correspond to a proximity value. The proximity value can be indicative of a relevance or proximity of a relationship between any two entities. In some instances, any two entities in the knowledge graph can have a proximity relationship. In some instances, two entities in the knowledge graph can have a proximity relationship only if the proximity value is at or above a predetermined threshold (e.g., 0.5, 0.6, 0.7, 0.8, 0.9, or other scale, etc.).

By way of example of traversing the knowledge graph 700, if a search performed by the second user 708 retrieves the first record 702, the second record 704 can be retrieved by context by at least three paths. A first path involves a record relationship between the first record 702 and other users. Because the first record 702 was viewed by the first user 706 who also viewed a second record 704, the system may contextually retrieve the second record 704 for the second user 708. A second path involves a user relationship between the second user 708 and the first user 706. Because the second user 708 and the first user 706 are have a coworker relationship, the system can contextually retrieve the second record 704 that the second user's coworker, the first user 706, also viewed for the second user 708. In another example, the first record 702 and the second record 704 can have an inter-records relationship (not shown), and the second record 704 can be contextually retrieved by the system for the second user 708 based on this inter-records relationship. Alternatively or in addition, any combination of contextual relationships can be used to traverse the knowledge graph 700 between any two entities.

In some instances, the system may only traverse the knowledge graph between two entities (e.g., user, record, field of expertise, etc.) if the proximity value of the contextual relationship is at or above a predetermined threshold. In some instances, a priority value for the record retrieved by contextual traversing of the knowledge graph can be based at least in part on the proximity values of the contextual relationships traversed in the knowledge graph. The priority values of a plurality of records retrieved in the search results can be used to sort the search results by priority, (e.g., of relevance).

In some instances, the knowledge graph can comprise contextual information determined in prior operations. More specifically, it can comprise information related to taxonomy, but also user preferences determined through analysis of past user behavior (e.g., via the user behavior feedback loop of FIG. 6). The system may use such contextual information to, for example, determine starting points for traversing the graph-based data structure. For example, the system may identify a certain number (e.g., 1, 2, 3, 4, 5, 6, 7, 8, 9, 10, 20, 30, 40, 50, etc.) of the most proximate records to a search query. Each of the records identified can be used as starting points of individual traversals. In some instances, the system may use a traversal algorithm that determines a similarity score between records. The similarity score may be based at least on the proximity values of the contextual relationships traversed. In some instances, the priority value of the knowledge graph-retrieved results, discussed above, can be based at least in part on the similarity score.

In some instances, the system may retrieve, and present as enhanced search results, only additional records that have a similarity score of above a predetermined threshold (e.g., 0.7, 0.8, 0.9, etc.). Alternatively or in addition, the system may retrieve as enhanced search results the records that experts in the field identified as relevant, for example, such relevance being determined by a number of views of the record by expert users in a record relationship, and the expertise of users in turn determined by proximity values of expert relationships between users and fields of expertise.

The enhanced search query, for example, enhanced by the systems and methods described herein, can be dispatched 114 to execute the search. A query mapper and reducer 170 may, based on the one or more execution methods previously determined from the query type (e.g., resolving 108 execution method), for example from the registry, route the search query to different execution modules, search as a search engine 172 (for the 'search_engine' execution method), a knowledge graph 174 (for the 'knowledge-_graph' execution method), and/or a records graph 176 (for the 'records_graph' execution method). A records graph may be similar to the knowledge graph described above, but comprising records and contextual relationships between records. In some instances, the records graph can be a sub-unit of the knowledge graph. The system may retrieve search results 104 based on the execution.

In some instances, the system can distinguish 'hot' and 'cold' records. Hot records can be records that have been accessed in the last six months, and cold records can be records that have not been accessed in the last six months. Alternatively, the time frame dividing hot and cold records can be any other time frame, such as, the last second, last minute, last hour, last 2 hours, last 3 hours, last 4 hours, last 6 hours, last 12 hours, last day, last 2 days, last 3 days, last 4 days, last week, last 2 weeks, last 3 weeks, last month, last 2 months, last 3 months, last 4 months, last year, last 2 years, last 3 years, last 4 years, last 5 years, last decade, or any other time frame. In some instances, the system may only retrieve hot records. Beneficially, a user may obtain results that other users already found to be at least relevant enough to access. The user may have the option to repeat the search to retrieve additionally the cold records. For example, on a graphical user interface that presents the results to the user, such as on a display, the system may provide a user interactive object (e.g., button, slider, etc.) that the user may interact with to trigger the search.

The retrieved search results 104 can thereafter be sorted, such as by priority values assigned for the records. The search session, including the search query, tokenized search query, enhanced search query, search results, enhanced search results, and user activities in relation to retrieved search results, may be stored by the system, such as in one or more databases (e.g., knowledge graph, record graph, training data, etc.).

It will be appreciated that the operations described herein, such as the enhancing operations with respect to FIG. 1, need not necessarily be performed in the order that they were described. For example, knowledge graph based enhancements can occur before user behavior based enhancements. In another example, the execution methods can be resolved after the queries are enhanced via one or more of NLP models, knowledge graphs, and/or user behavior. The systems and methods can be fluid.

FIG. 8 shows sample queries and processing methods according to the systems and methods of the present disclosure. The query type of user-generated queries can be identified, such as by applying part-of-speech based NLP models, for example, described with reference to FIG. 4. For example, a query of "I need tax audit records" can be identified as a query type of 'what,' based at least on the "I need" part-of-speech pattern. A query of "I need to audit tax records" can be identified as a query type of 'how' based at least on the "I need to" part-of-speech pattern. A query of "looking for tax forms in box 123" can be identified as a query type of 'what qualified' based at least on the "looking for" part-of-speech pattern. The system may perform a taxonomy extraction on the query to determine, for example, keywords. In some instances, the taxonomy extraction can be based on patterns of regular expression (e.g., regex) and/or part-of-speech. For example, the query of "looking for tax forms in box 123" may extract the taxonomy component of "box 123" for the qualified query type.

The system may determine the context of the query types by matching the search queries to the NLP model library, such as via a graph database comprising the NLP model library. For the query of "I need tax audit records," the system may determine the contexts of "options for tax," "corporate tax," and "employee tax." For the query of "looking for tax forms in box 123," the system may determine the contexts of "options for tax," "corporate tax," and "employee tax."

The system may determine usage patterns specific to the user submitting the query. In some instances, the system may execute a user behavior feedback loop, described elsewhere herein. For example, all three users with the above three query samples may be identified to work in corporate finances, and the system may recommend putting more weight on the context of "corporate tax."

The system may enhance the sample queries based at least in part on the query type, extracted taxonomy, context and/or usage patterns of the sample queries. For example, for the query of "I need tax audit records," which has a 'what' query type, the system may identify better synonyms (e.g., from a lexicon dictionary) or any additional keywords that were not contained in the original query that is related to the context of the query. For example, these keywords may be identified from NLP models proximate to the context NLP models (e.g., "options for tax," "corporate tax," "employee tax," etc.) identified for the query. By way of example, the system may append the keywords, "IRS filings" to the original query. In another example, for the query of "I need to audit tax audit records," which has a 'how' query type, the system can identify taxonomy components used to best execute the query. By way of example, the system may utilize records sharing activity data and taxonomy used at the time of the search. In yet another example, for the query type of "looking for tax forms in box 123," which has a 'what qualified' query type, the system may add the taxonomy filter of the extracted taxonomy component of "box 123." The search can be executed based on execution methods mapped to the query type. For example, for 'what' and 'what qualified' query types, a keyword type search (e.g., "search_engine" method) can have more weight (e.g., higher priority weight values) than a graph type search (e.g., "knowledge_graph" method, "records_graph" method, etc). In another example, for a 'how' query type, a graph type search (e.g., "knowledge_graph" method, "records_graph" method, etc." can have more weight than a keyword type search.

In some instances, the operations described herein, such as receiving a query, initial processing, resolving execution methods, enhancing based on user behavior, executing a user behavior feedback loop, enhancing a search query, dispatching a search, mapping and/or reducing a query, executing a search, delivering search results, and other operations can be performed or executed by one or more modules (e.g., comprising a processor and memory). The one or more modules, individually or collectively, can perform an operation or combination of operations of the present disclosure. A module can be a computer system.

Computer Control Systems

Figure 9:
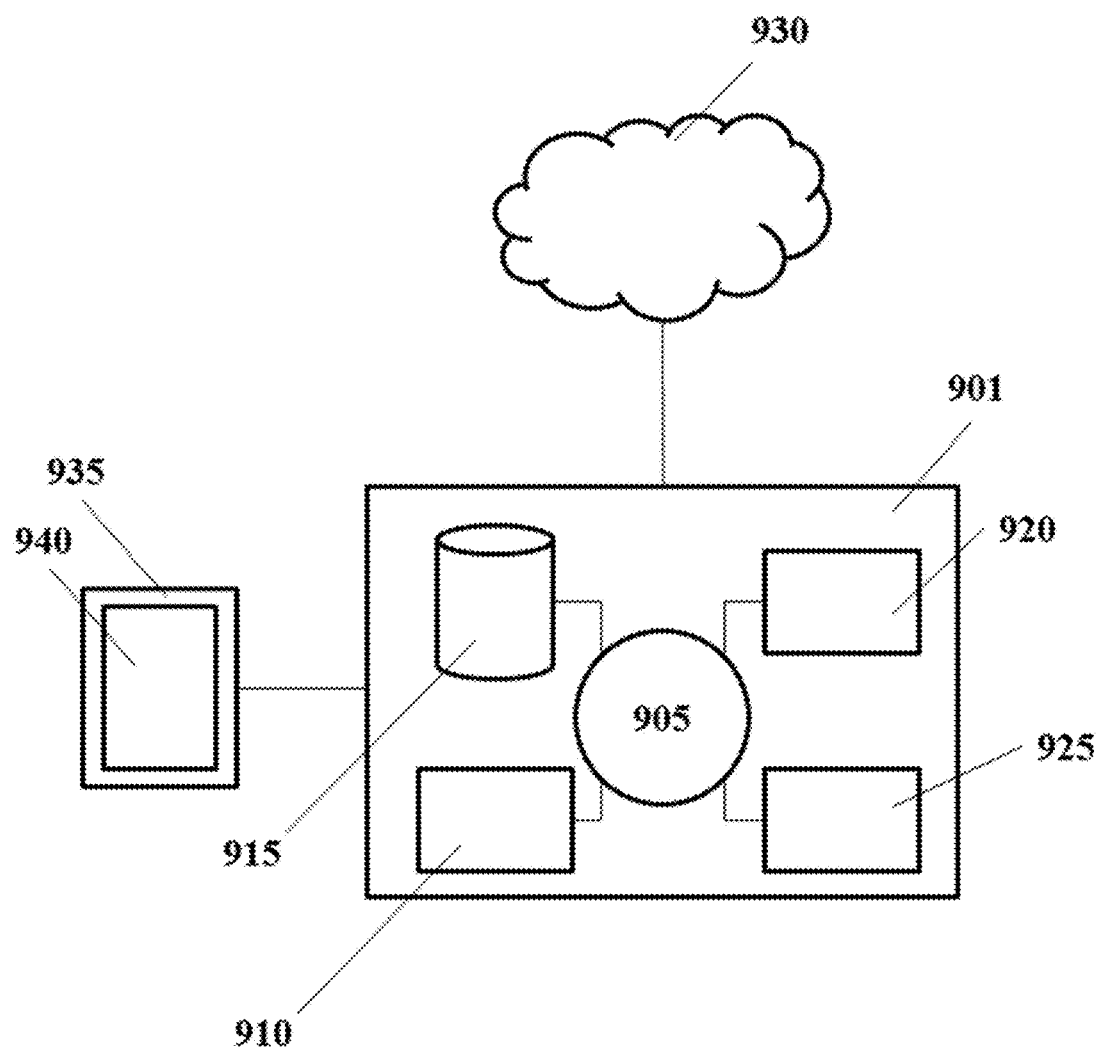
FIG. 9 shows a computer system that is programmed or otherwise configured to implement methods of the present disclosure.

The present disclosure provides computer control systems that are programmed to implement methods of the disclosure. FIG. 9 shows a computer system 901 that is programmed or otherwise configured for receiving queries, initial processing of queries, determining query types, resolving execution methods for query types, enhancing queries based on user behavior, executing a user behavior feedback loop, enhancing queries based on knowledge graphs, storing and navigating graph databases, dispatching a search, mapping and/or reducing a query, executing a search, delivering search results, filtering and/or sorting search results, and storing and learning from training data, among other operations. The computer system 901 can be an electronic device of a user or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The processor 905 can be a controller, microprocessor and/or a microcontroller. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user (e.g., user of the record management system). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for users to provide, for example, instructions to the record management system, and/or the record management system to be presented as a user-manageable interface. Examples of UI's include, without limitation, a graphical user interface (GUI) and web-based user interface. The computer system may display a graphical user interface and/or web-based user interface, such as to facilitate searches. The user may provide a search query, receive search results, provide definitions for query type registries, and perform other actions via a GUI and/or web-based user interface.

Methods and systems of the present disclosure can be implemented by way of one or more algorithms. An algorithm can be implemented by way of software upon execution by the central processing unit 905. The algorithm can, for example, be programmed for receiving queries, initial processing of queries, determining query types, resolving execution methods for query types, enhancing queries based on user behavior, executing a user behavior feedback loop, enhancing queries based on knowledge graphs, storing and navigating graph databases, dispatching a search, mapping and/or reducing a query, executing a search, delivering search results, filtering and/or sorting search results, and storing and learning from training data, among other operations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for contextually retrieving and contextually displaying records via a user interface, comprising:
    (a) receiving from a user, via the user interface, a search query;
    (b) determining, with aid of one or more computer processors, a query type for the search query based at least on a natural language processing (NLP) model definition for the query type;
    (c) accessing a registry of query types, wherein the registry maps query types to execution methods and comprises priority weight values associated with each query type and execution method pair in the registry, wherein the execution methods comprise at least a keyword search and a graph search;
    (d) resolving one or more execution methods mapped to the query type;
    (e) executing the search query using the one or more execution methods mapped to the query type to retrieve a plurality of records as search results, wherein a given record of the plurality of records is weighted by the priority weight values associated with the execution method used to retrieve the given record; and
    (f) displaying to the user, on the user interface, the plurality of records in an order determined at least in part by priority weight values of the plurality of records.

2. The method of claim 1, further comprising, prior to (e), enhancing the search query by appending one or more keywords not originally present in the search query or appending a taxonomy filter.

3. The method of claim 2, wherein the one or more keywords are based at least in part on user behavior data for a user providing the search query.

4. The method of claim 2, further comprising, prior to (e):
    determining a first NLP model corresponding to the search query, wherein the first NLP model corresponds to a first set of one or more keywords, wherein a component of the search query matches at least one keyword of the first set of one or more keywords;
    determining a second NLP model proximate to the first NLP model, wherein the second NLP model corresponds to a second set of one or more keywords, wherein the first NLP model and second NLP model have a proximity relationship with a weight value at or above a predetermined threshold; and
    enhancing the search query with keywords of the second set of one or more keyword not originally present in the search query.

5. The method of claim 2, further comprising, prior to (e), using a NLP model definition to perform a taxonomy extraction on the search query to determine the taxonomy filter.

6. The method of claim 5, wherein the NLP model definition is based at least in part on a pattern of part-of-speech or pattern of regular expression.

7. The method of claim 1, wherein the graph search comprises traversing a graph database comprising one or more entities and contextual relationships between the one or more entities to retrieve additional records that are contextually relevant to the plurality of records, a user providing the search query, or both.

8. The method of claim 7, wherein the one or more entities are at least one member from the group consisting of records, users, and fields of expertise.

9. The method of claim 1, wherein the NLP model definition for the query type is based at least on a pattern of part-of-speech.

10. A computer system for contextually retrieving and contextually displaying enhanced records via a graphical user interface, comprising:
    one or more processors; and
    a memory, communicatively coupled to the one or more processors, including instructions executable by the one or more processors, individually or collectively, to implement a method for classifying a record, the method comprising:
    (a) receiving, from a user, via the graphical user interface, over a computer network, a search query;
    (b) accessing, from a graph database, a natural language processing (NLP) model library, wherein the NLP model library comprises a plurality of NLP models, wherein a given NLP model of the plurality of NLP models corresponds to one or more sets of keywords;
    (c) matching the search query against the NLP model library to determine a first NLP model corresponding to the search query, wherein a component of the search query matches at least one keyword of the one or more sets of keywords of the first NLP model;

(d) determining one or more other NLP models proximate to the first NLP model, wherein the first NLP model and each of the one or more other NLP models have a proximity relationship with a weight value at or above a predetermined threshold;

(e) enhancing the search query by appending one or more keywords corresponding to the one or more other NLP models that are not originally present in the search query;

(f) executing the enhanced search query to retrieve a plurality of contextually enhanced records as search results, wherein executing the enhanced search query comprises using one or more execution methods associated with a query type of the enhanced search query, the one or more execution methods resolved from a plurality of execution methods which comprises at least a keyword search and a graph search; and (g) displaying, to the user, on a graphical user interface communicatively coupled to the one or more processors, the plurality of contextually enhanced records.

11. The computer system of claim 10, wherein the method further comprises:

determining, with aid of the one or more computer processors, the query type for the enhanced search query based at least on a natural language processing (NLP) model definition for the query type;

accessing a registry of query types, wherein the registry maps query types to the plurality of execution methods and comprises priority weight values associated with each query type and execution method pair in the registry; and executing the enhanced search query using the one or more execution methods mapped to the query type to retrieve the plurality of contextually enhanced records, wherein a given record of the plurality of contextually enhanced records is weighted by the priority weight values associated with the execution method used to retrieve the given record, wherein the plurality of contextually enhanced records is displayed in an order determined at least in part by priority weight values of the plurality of contextually enhanced records.

12. The method of claim 11, wherein the graph search comprises traversing a graph database comprising one or more entities and contextual relationships between the one or more entities to retrieve additional records that are contextually relevant to the plurality of contextually enhanced records, a user providing the search query, or both.

13. The method of claim 12, wherein the one or more entities are at least one member from the group consisting of records, users, and fields of expertise.

14. The computer system of claim 10, wherein the search query is further enhanced by appending one or more keywords that are based at least in part on user behavior data for the user.

15. The computer system of claim 14, wherein the user behavior data is stored in, and accessed from, a graph database.

16. The computer system of claim 14, wherein the method further comprises, prior to (f), executing a user behavior feedback loop on the user to determine the user behavior data.

17. The computer system of claim 16, wherein the user behavior data comprises at least one of data on whether an record of the plurality of contextually enhanced records is selected or unselected, time spent viewing a selected record of the plurality of contextually enhanced records, and a degree of scrolling or pagination that a user performs in a record.

18. The computer system of claim 14, wherein the method further comprises, subsequent to (g) receiving user behavior data from the user.

* * * * *